UNITED STATES PATENT OFFICE.

LUDWIG SEITZ AND HERMANN WINTZ, OF ERLANGEN, GERMANY, ASSIGNORS TO SOCIETY OF CHEMICAL INDUSTRY IN BASLE, OF BASEL, SWITZERLAND.

PROCESS FOR THE MANUFACTURE OF A MENSES-CONTROLLING PREPARATION FROM CORPUS LUTEUM.

1,318,699.   Specification of Letters Patent.   Patented Oct. 14, 1919.

No Drawing.   Application filed April 14, 1915. Serial No. 21,405.

*To all whom it may concern:*

Be it known that we, LUDWIG SEITZ, doctor of medicine and professor, a subject of the King of Bavaria, and resident of Erlangen, Germany, and HERMANN WINTZ, doctor of medicine, a subject of the King of Bavaria, and resident of Erlangen, Germany, have invented a new Process for the Manufacture of a Menses-Controlling Preparation from Corpus Luteum, of which the following is a full, clear, and exact specification.

All preparations hitherto proposed for regulating menstruation have the common disadvantage that they contain more or less injurious admixtures and are uncertain in their action on account of the prevailing method of administration per os and inexact dosage. We have now found that a therapeutically valuable substance, which can be exactly dosed and injected, can be isolated in a pure state from the corpus luteum and that the substance thus obtained possesses pronounced menses controlling properties and is probably identical with the substance which produced in the female ovaries suppresses menstruation in a physiological manner.

The carrying out of the process may be illustrated as follows:

The corpus luteum is at once removed from the ovary of a freshly slaughtered animal and preserved in absolute alcohol in dark bottles.

The yellow bodies are reduced in a meat chopping machine, extracted with absolute alcohol, for 24 hours at 60° C. The solution is then filtered and the residue is extracted successively with acetone, cold ether and boiling ether until the solvent passes colorless. The corpus luteum magma left after filtration is dried, further reduced in a grating machine and a complete disintegration of the tissues is obtained by trituration with quartz sand in a mortar. The pulverized mass of corpus luteum is further extracted with chloroform for 24 hours at 60° C. and finally boiled out again with alcohol. The alcoholic extracts aforesaid are poured together and from them is separated in the manner described in the specification of our application for Letters Patent No. 21,404 by addition of an excess of chloroform, an aqueous solution containing the therapeutic antipode, also contained in the corpus luteum, that is to say the menses increasing lecitalbumen which is isolated in the manner explained in the said specification.

The alcohol-chloroform mixture free of water, remaining after the water separation, is now evaporated to constant weight. The residue constitutes a fatty mass formed of two parts the one of which shows a claret red-brown coloration and is easily soluble in ether, difficultly soluble in alcohol and insoluble in acetone, while the other forms a white shiny waxlike mass difficultly soluble in ether and insoluble in alcohol.

Only the former need be used for the further preparation. For this purpose the residue is dissolved in ether, the ether extracts obtained as above described being employed therefor. The liquid is then evaporated to dryness as quickly as possible. The orange-yellow mass thus obtained is again dissolved in ether, the solution filtered and evaporated in a vacuum until a mass of uniform consistency and composition, namely the therapeutically valuable menses controlling substance is obtained. This latter is then rubbed in small portions together with olive oil in a mortar and so brought into solution. The concentration is chosen in such a manner that 1 cubic centimeter corresponds to 0.4 gram of the fresh corpus luteum substance, the concentration of the active lipoid-group being thus of 0.0015 by 1 cubic centimeter. The sterilization of the dissolved preparation is effected by means of Uhlenhut-Berkhefeld filters, which have been tested previously for their impermeability to any germs likely to occur.

The menses controlling substance obtained according to the new process belongs to the class of lipoids, has a deep claret red-brown coloration, is of a soft tenacious consistence, easily soluble in ether, difficultly soluble in alcohol and begins to melt at 45° C. The analysis gave the following results:

| | |
|---|---|
| Carbon | 61.20% |
| Hydrogen | 12.50% |
| Nitrogen | 4.33% |
| Sulfur | 2.29% |
| Phosphor | 2.83% |
| Oxygen | 16.85% | from which may be calculated as the most simple empirical formula: $C_{73}H_{179}N_4O_{15}SP$. This substance is indicated in all cases of excessive menstruation and all uterine bleeding, which does not depend on an organic cause. Its administration tends to bring about the cessation of such bleeding. Its styptic action is particularly quick in case of bleeding during puberty and in all those menstruation anomalies in which no change of the sexual organs or functional disturbance can be detected. The preparation has also a tonic action on the function of the ovaries, as it controls irregular menstruation periods, it influences also favorably severe pains during the menstruation. The effects of menses deficiency after castration are also mitigated or suppressed by the preparation.

The employment of this latter occurs either by subcutaneous injection or by taking it per os in form of pastils. The substance is, even when often injected, non-exciting, entirely harmless and non-poisonous. It never produces anaphylactic phenomena.

What we claim is:

The described process for the manufacture of a menses controlling preparation from corpus luteum, consisting in separating from the alcoholic extracts obtained by extracting successively ovaries with alcohol, acetone, cold and warm ether, chloroform and hot alcohol, first the water and the constituents soluble in water by addition of an excess of chloroform, recuperating from the remaining alcohol-chloroform mixture the menses controlling substance by evaporation and extracting again the residue of the evaporation with both the ether extracts previously obtained, evaporating the extract thus obtained to dryness, redissolving the orange-yellow mass thus obtained, filtering the solution and evaporating the same in a vacuum until a mass of uniform consistency is obtained.

In witness whereof we have hereunto signed our names this 23rd day of March, 1915, in the presence of two subscribing witnesses.

DR. LUDWIG SEITZ.
DR. HERMANN WINTZ.

Witnesses:
OSCAR BOCK,
WILLY FOHMUND.